US009184571B2

(12) United States Patent
Lias et al.

(10) Patent No.: US 9,184,571 B2
(45) Date of Patent: Nov. 10, 2015

(54) AUTOMATIC DEAD FRONT DISCONNECT AND LOCKOUT

(71) Applicant: Eaton Corporation, Cleveland, OH (US)

(72) Inventors: Edward Ethber Lias, Aliquippa, PA (US); Hoyma Joel Mazara, Distrito Nacional (DO); Andy Jay Foerster, Wexford, PA (US)

(73) Assignee: EATON CORPORATION, Cleveland, OH (US)

( * ) Notice: Subject to any disclaimer, the term of this patent is extended or adjusted under 35 U.S.C. 154(b) by 449 days.

(21) Appl. No.: 13/688,351

(22) Filed: Nov. 29, 2012

(65) Prior Publication Data
US 2014/0144760 A1   May 29, 2014

(51) Int. Cl.
*H01H 3/16* (2006.01)
*H01H 35/02* (2006.01)
*H02B 1/26* (2006.01)

(52) U.S. Cl.
CPC . *H02B 1/26* (2013.01); *H01H 3/161* (2013.01)

(58) Field of Classification Search
CPC ............. H01H 3/16; H01H 3/00; H01H 3/02; H01H 3/162; H01H 3/32; H01H 9/02; H01H 9/0264; H01H 9/287; H01H 33/46; H01H 33/59; H01H 33/53; H01H 71/00; H01H 71/02; H01H 71/0207; H01H 71/0235; H01H 71/025; H01H 71/0264; H01H 71/0271; H01H 71/60; H01H 73/00; H01H 73/06; H01H 75/00; H01H 77/00; H01H 2009/02; H01H 2009/20; H01H 2027/00; H01H 2033/53; H01H 2223/00; H01H 2223/044; H01H 2225/006; H01H 2233/03; H01H 2239/032
USPC .......... 200/43.01, 43.11, 43.14–43.16, 43.19, 200/43.22, 61.81, 50.08, 50.1, 50.02
See application file for complete search history.

(56) References Cited

U.S. PATENT DOCUMENTS

| 2,404,230 | A | * | 7/1946 | Harlow et al. ................. 337/196 |
| 3,656,022 | A | * | 4/1972 | Greenwood ..................... 361/11 |
| 4,038,626 | A | * | 7/1977 | Haydu et al. ...................... 337/4 |
| 4,208,693 | A | * | 6/1980 | Dickens et al. .................. 361/94 |
| 4,506,121 | A | * | 3/1985 | Peterson et al. ............ 200/50.28 |
| 8,054,606 | B2 | * | 11/2011 | Morris et al. ................. 361/115 |
| 2011/0188167 | A1 | * | 8/2011 | True et al. ..................... 361/269 |

* cited by examiner

*Primary Examiner* — Edwin A. Leon
*Assistant Examiner* — Anthony R. Jimenez
(74) *Attorney, Agent, or Firm* — Eckert Seamans Cherin & Mellott, LLC; Grant E. Coffield; John P. Powers

(57) ABSTRACT

An electrical enclosure that includes a dead front and a lockout switch is described herein. The lockout switch detects the position of the dead front. Based on the detected position of the dead front, the lockout switch actuates a power disconnection mechanism. In one embodiment, the disconnection mechanism is a shunt trip breaker that trips at least one circuit breaker when actuated by the lockout switch detecting removal of the dead front. The shunt trip breaker receives power from a main conductor to a coil that moves a solenoid.

14 Claims, 5 Drawing Sheets

AUTOMATIC DEAD FRONT DISCONNECT AND LOCKOUT

BACKGROUND

Load centers are a component of an electrical supply system which divides electrical power to subsidiary circuits. The circuits are associated with protective fuses or circuit breakers capable of interrupting the flow of current to a particular circuit. The total current flowing into a residential, commercial, or industrial load center can be manipulated from a load center. Load centers are "dead front," meaning that the user cannot contact live electrical components when the dead front is attached. While preventing access to the live portion of the electrical components, the dead front still allows the electrical components to operate. For example, with a dead front attached, a circuit breaker can still be tripped by pulling the handle of the circuit breaker. Access to live electrical components may result in damage to the load center, injury to the user, and can cause severe electrical safety concerns when the load center is active.

SUMMARY

An electrical enclosure is provided that includes a dead front and a lockout switch. The lockout switch detects the position of the dead front. Based on the detected position of the dead front, the lockout switch actuates a power disconnection mechanism. In one embodiment, the disconnection mechanism is a shunt trip breaker that trips at least one circuit breaker when actuated by the lockout switch detecting removal of the dead front. The shunt trip breaker receives power from a main conductor to a coil that moves a solenoid.

In one embodiment, a lockout switch arm is mechanically connected to the lockout switch. When the dead front is attached to the electrical enclosure, the lockout switch arm is in a compressed position. When the dead front is removed, the lockout switch arm moves to a decompressed position. In another embodiment, an electro-mechanical switch is magnetically coupled to the lockout switch.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

To keep the general public from accessing load centers, load centers are typically housed in a dead front electrical enclosure. If the dead front is tampered with, a lockout switch is activated. Specifically, the lockout switch employs a lockout switch arm. The lockout switch arm is positioned against the dead front. If the dead front is tampered with, the dead front no longer exerts a force on the lockout switch arm and the lockout switch arm is released. Releasing the lockout switch arm activates the lockout switch. The lockout switch triggers a shunt trip thereby tripping the main circuit breakers inside the electrical enclosure. This renders the load center inactive so that a user cannot contact the power flowing through the load center or create a risk to themselves or the environment of the load center.

Figure 1A:
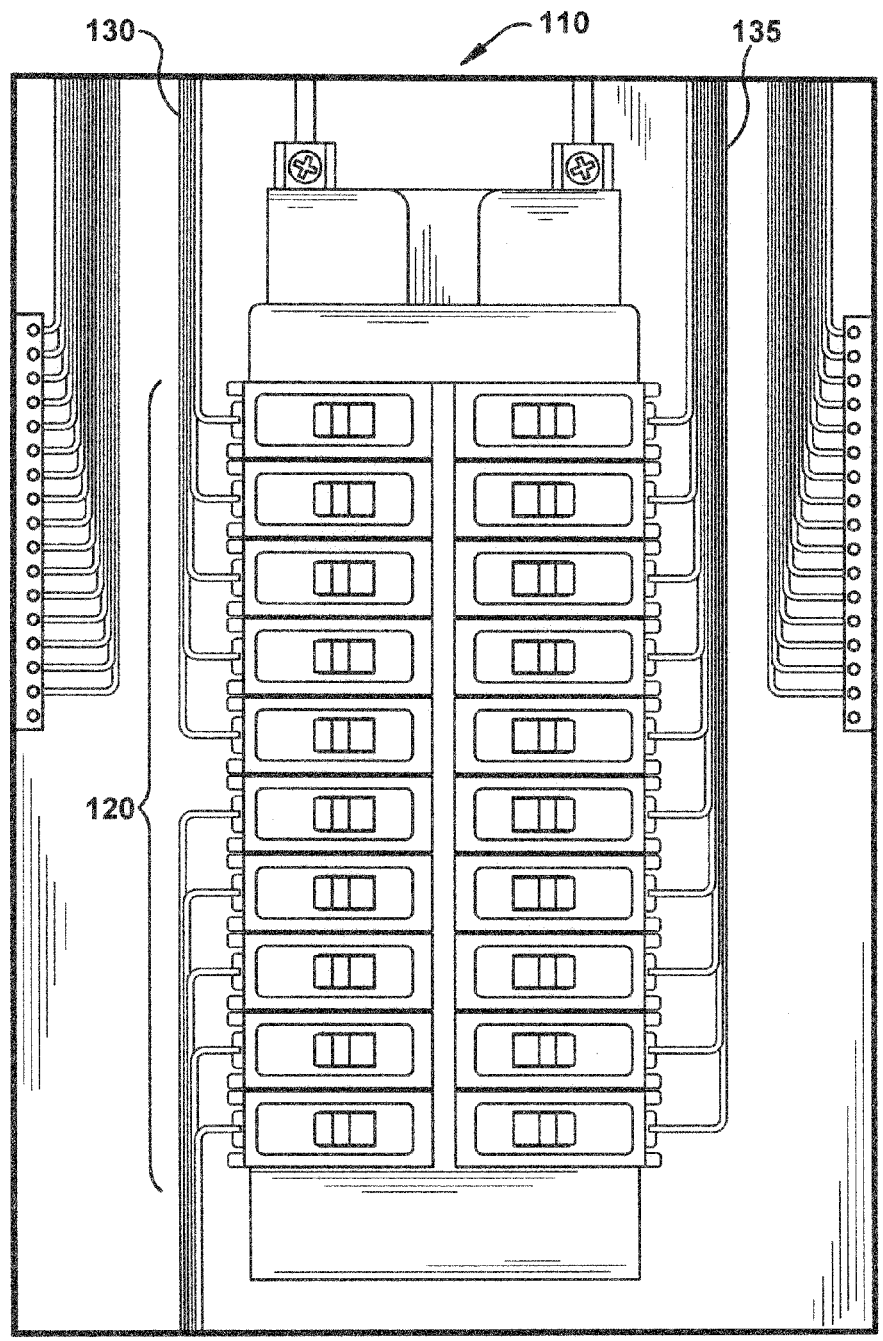
FIG. 1A illustrates an example embodiment of a load center with a dead front removed.

FIG. 1A illustrates an example embodiment of a circuit breaker load center 110 with a dead front removed. The circuit breaker load center 110 houses electrical components 120 (e.g., circuit breakers, wiring, and contacts). The electrical components 120 carry two phases of power using two separate sets of current-carrying conductors 130 and 135. For example, the conductor 130 provides phase (Ø)A power and the conductor 135 provides ØB power. The electrical components 120 are considered to be either front mount or side mount depending on where the conductors 130 and 135 interface with the electrical components 120. Because the conductors 130 and 135 interface with the electrical components 120 at the side of the electrical components 120, the load center 110 shown in FIG. 1A is a side mount load center. Alternatively, the electrical components 120 of FIG. 1 may be mounted in different configurations (e.g., front mount).

With the dead front removed, the live portions of the electrical components 120 and the conductors 130 and 135 are exposed. Exposing the live portions of the electrical components 120 and the conductors 130 and 135 is sometimes necessary, for example, when the circuit breaker load center 110 is undergoing maintenance. However, live electrical components 120 and the conductors 130 and 135 are usually covered to protect users from contact with electricity and protect the circuit breaker load center 110 from environmental contaminants (moisture, precipitation, insects, dust).

Figure 1B:
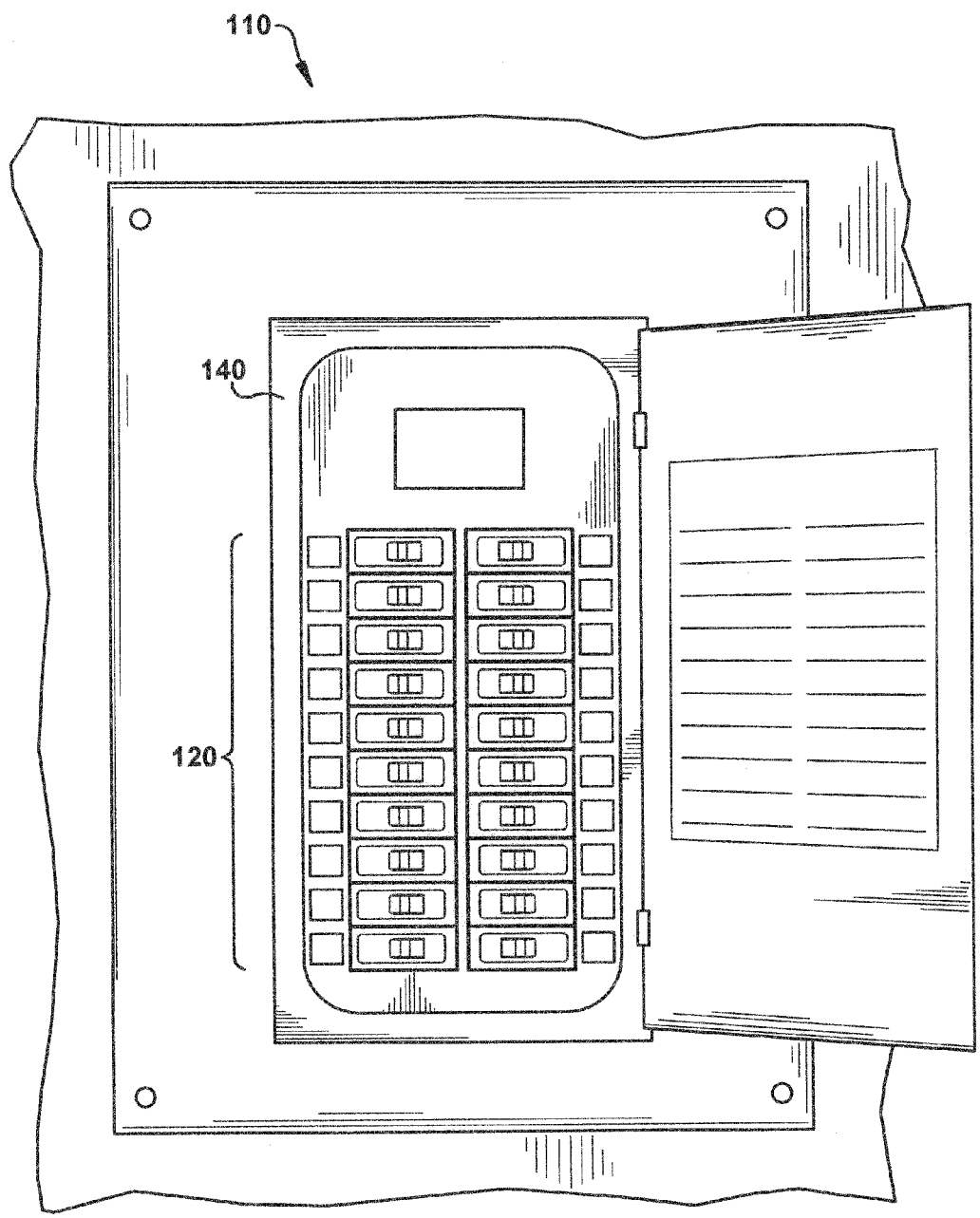
FIG. 1B illustrates an example embodiment of a load center with a dead front installed.

FIG. 1B illustrates an example embodiment of the circuit breaker load center 110 with a dead front 140 installed. The dead front 140 conceals the live portions of the electrical components 120. The dead front 140 allows the electrical components 120 to be operated without exposing the live conductors 130 and 135. The dead front 140 may have a number of removable sections.

The removable sections are shaped to fit the electrical components 120 and allow the electrical components 120 to be accessed and operated. Thus, the circuit breaker load center 110 can be used without the conductors 130 and 135 being vulnerable to tampering or contamination.

Figure 2:
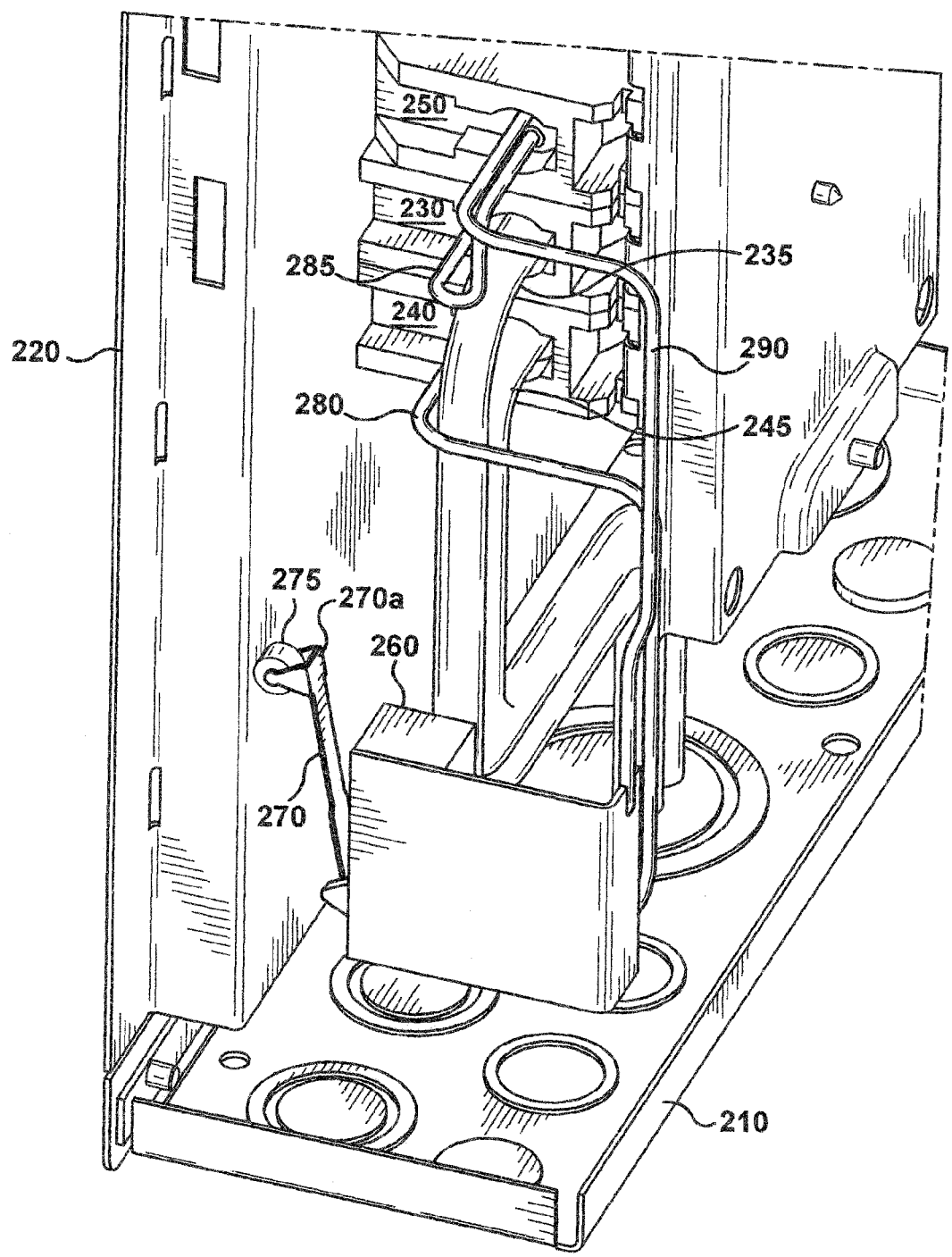
FIG. 2 illustrates a cutaway view of a side mount load center with one embodiment of a lockout switch in a compressed position.

FIG. 2 is a cutaway illustration of an example embodiment of a circuit breaker load center covered and protected by an enclosure 210. The enclosure 210 has a dead front 220. The dead front 220 has a number of removable sections to allow access to the circuit breakers 230 and 240. Accordingly, the circuit breakers 230 and 240 are operable but the live conductors (not shown) are covered. The dead front 220 is a separate piece connected by fasteners (e.g., screws, latches, bolts) to the enclosure 210 and is adjustable relative thereto. The dead front 220 may include a dead front trim where the fasteners affix the dead front 220 to the enclosure 210.

The first circuit breaker 230 and the second circuit breaker 240 serve as main circuit breakers for first and second phases (Ø) of power supplied to the load center 200. For example, the first circuit breaker 230 receives ØA power through the first conductor 235. The second circuit breaker 240 receives ØB power through the second conductor 245. The dead front 220 is shown in the attached position such that the dead front 220 covers the conductors 235 and 245 that are connected to the first circuit breaker 230 and the second circuit breaker 240.

A lockout switch 260 has a lockout switch arm 270. The lockout switch arm 270 is positioned so that a distal end of the lockout switch arm 270a is compressed by the dead front 220. Accordingly, if the dead front 220 is tampered with (e.g. removed), the dead front 220 no longer compresses the switch arm 270 and the switch arm 270 is released to a decompressed position. When the switch arm 270 is in the decompressed position, the lockout switch 260 is activated. Power to the load center 200 is cut when the lockout switch 260 is activated. Instead of a mechanical lockout switch, the presence of the dead front 220 may be sensed using ultrasonic sensors, magnetic sensors, or photoelectric proximity sensors.

The walled enclosure 210 also houses a shunt trip breaker 250. The shunt trip breaker 250 is an electrically operated mechanical switch. The shunt trip breaker 250 mechanically trips the first circuit breaker 230 and/or the second circuit breaker 240 when the lockout switch is activated. As will be described in more detail with respect to FIG. 4, the shunt trip breaker 250 has a built-in magnetic coil that can be energized externally to trip the first circuit breaker 230 and/or the second circuit breaker 240.

The lockout switch 260 controls the flow of power to shunt trip 250 by selectively energizing the shunt trip 250 when the dead front 220 is removed. The shunt trip 250 receives power from the first conductor 235 and the second conductor 245 as routed through the first circuit breaker 230 and the second circuit breaker. Specifically, the shunt trip breaker is on a loop including a first line 280, a second line 285, and a third line 290 to form a circuit between the circuit breakers 230 and 240, the shunt trip breaker 250, and the lockout switch 260. The first line 280 provides current between the lockout switch 260 and the circuit breakers 230 and 240. The second line 280 provides current between the circuit breakers 230 and 240 and the shunt trip breaker 250. The third line 290 carries current between the shunt trip breaker 250 and the lockout switch 260.

A distal end of lockout switch arm 270a is positioned against the dead front 220. In one embodiment, the lockout switch arm 270 is spring loaded so that the biasing force of a spring urges the lockout switch arm 270 toward the dead front 220. When the dead front 220 is attached, the lockout switch arm 270 is compressed by the dead front. When the lockout switch arm 270 is compressed by the attachment of the dead front 220, the lockout switch 260 is electrically open. The shunt trip breaker 250 is not energized when the lockout switch 260 is open. Accordingly, the first circuit breaker 230 and the second circuit breaker 240 operate normally when the dead front 220 is attached and the lockout switch arm 270 is compressed.

In one embodiment, the distal end of the lockout switch arm 270a includes a roller 275. The roller 275 facilitates compression when the dead front 220 is attached to the electrical enclosure 210 and also reduces the amount of friction acting on the distal end of the lockout switch arm 270a.

Figure 3:
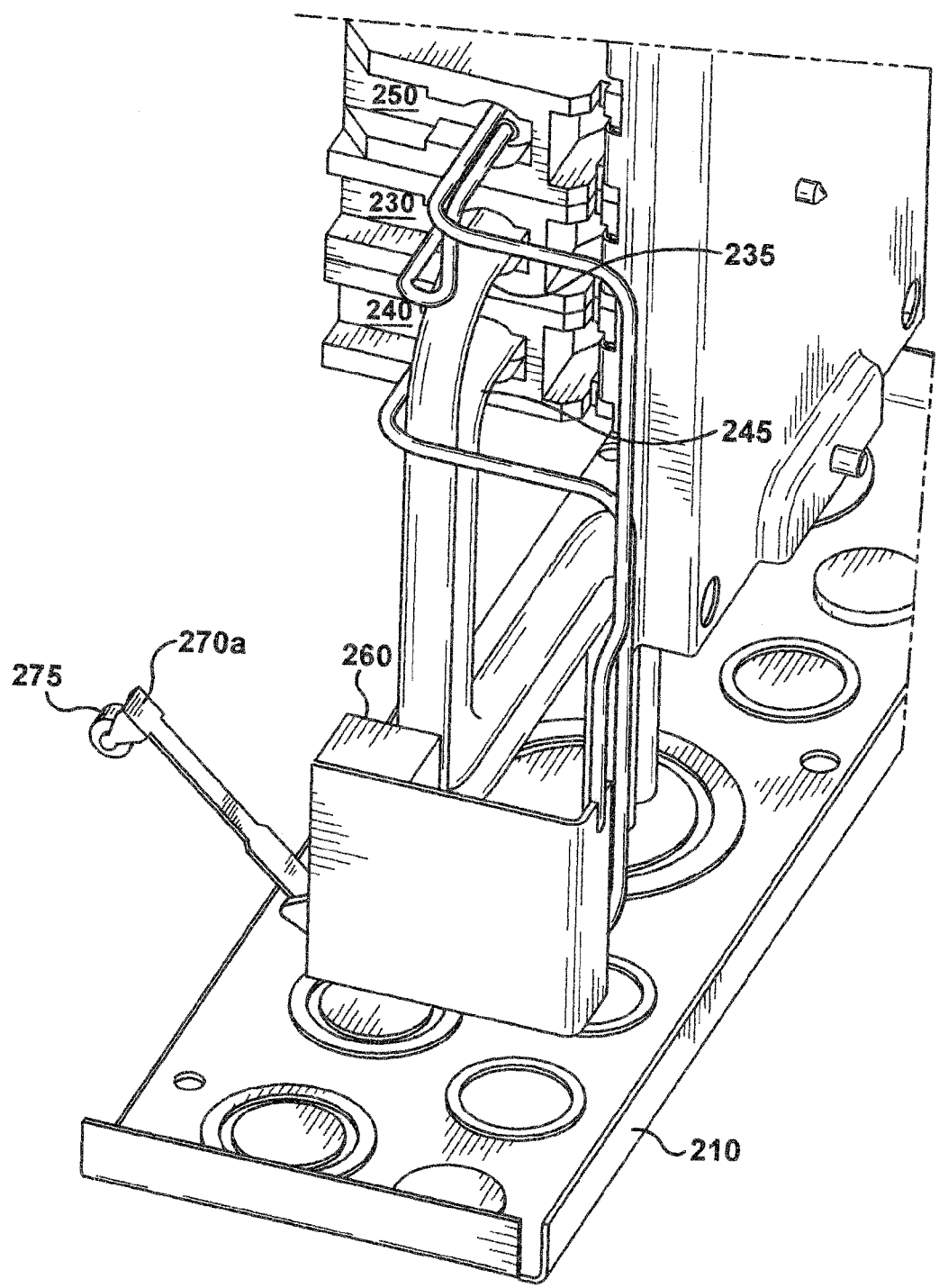
FIG. 3 illustrates a cutaway view of a side mount load center with one embodiment of a lockout switch in a decompressed position.

FIG. 3 illustrates a cutaway side view of one embodiment of a side mount load center 200 with a lockout switch arm 270 in a decompressed position. FIG. 3 illustrates the same features as FIG. 2, but with the dead front 220 removed and consequently the distal end of the lockout switch arm 270a decompressed, thereby activating the lock out switch 260. In the uncompressed position, the lockout switch 260 is electrically closed, connecting power from the conductors 235 and 245 to the shunt trip 250. The shunt trip 250 mechanically trips the first circuit breaker 230 and the second circuit breaker 240. Therefore, when the dead front 220 is removed, the circuit breakers 230 and 240 are tripped.

As described, the lockout switch 260 is activated by the mechanical interaction between the dead front 220 and the lockout switch arm 270. The lockout switch 260 may alternatively or additionally be activated by electrical or optical means. For example, the lockout switch 260 may detect the position of the dead front 220 with an electro-mechanical switch.

Figure 4:
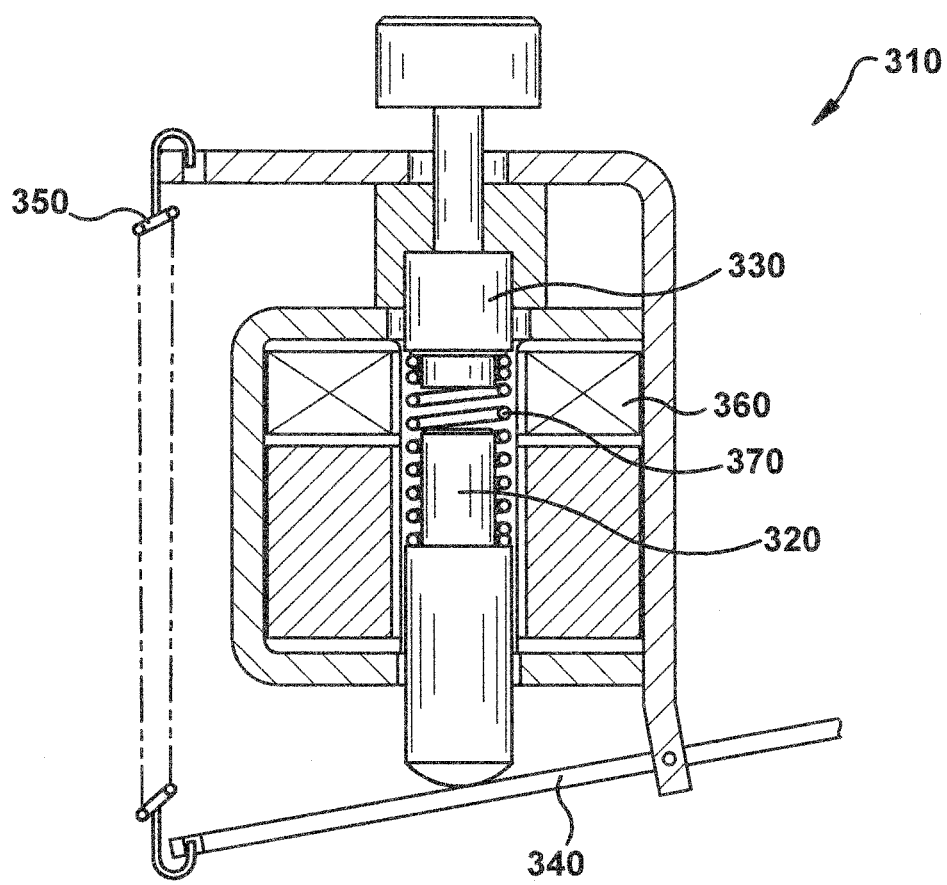
FIG. 4 illustrates one embodiment of a shunt trip mechanism for use in one embodiment of a load center with a lockout switch.

FIG. 4 illustrates a cross section view of an example embodiment of a shunt trip circuit breaker 310. The shunt trip automatically opens a circuit breaker in response receiving a control signal. The shunt trip circuit breaker 310 has a pair of aligned plungers 320 and 330. A first plunger 320 acts on an operating member 340 which is pivotal and connected to a spring 350. A second plunger 330 is manually displaceable. The plungers 320 and 330 are part of a magnetic circuit, with a magnetic field being generated by a permanent magnet 360 and an electromagnet 370. The permanent magnet 360 and the electromagnet 370 generate fields of opposite polarity.

When current is not flowing through the electromagnet 370, the field generated by the permanent magnet 360 is the only magnetic field. The field generated by the permanent magnet 360 is sufficiently strong to hold the two plungers 320 and 330 together. The spring 350 acting on the operating member 340 will cause the operating member 340 to be in a non-tripping position. Therefore, when current is not flowing through the electromagnet 370, the shunt trip is not tripped by the operating member 340.

When a control signal is received, current is provided to the electromagnet 370. The strength of the field generated by the electromagnet 370 overcomes the strength of the field generated by the permanent magnet 360. The force of the field generated by the electromagnet 370 repels the second plunger 330 from the first plunger 320. Consequently, the operating member moves into a tripping position. Therefore, when current is flowing due to a received control signal, the shunt trip is tripped by the operating member 340.

An electrical enclosure includes a dead front and a lockout switch. The lockout switch detects the position of the dead front. Based on the detected position of the dead front, the lockout switch actuates a power disconnection mechanism. In one embodiment, the disconnection mechanism is a shunt trip breaker that trips at least one circuit breaker when actuated by the lockout switch detecting removal of the dead front. The shunt trip breaker receives power from a main conductor to a coil that moves a solenoid.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. An electrical enclosure, comprising:
   a dead front;
   a lockout switch configured to detect a position of the dead front; and
   a lockout switch arm mechanically connected to the lockout switch,
   wherein, responsive to movement of the dead front, the lockout switch automatically actuates a power disconnection mechanism,
   wherein the lockout switch arm is in a compressed position biasing the dead front when the dead front is attached to the electrical enclosure,
   wherein the lockout switch arm is in a decompressed position when the dead front is removed, and
   wherein the lockout switch arm moves from the compressed position to the decompressed position in response to removal of the dead front.

2. The electrical enclosure of claim 1, where the disconnection mechanism is a shunt trip breaker configured to trip at least one circuit breaker when actuated by the lockout switch.

3. The electrical enclosure of claim 2, where the shunt trip breaker includes a permanent magnet and an electromagnet, where the permanent magnet has a first magnetic field, where, when current does not flow through the electromagnet, the electromagnet does not generate a magnetic field, and where, responsive to receiving a control signal, current flows through the electromagnet to generate a second magnetic field opposite the first magnetic field in order that the shunt trip breaker trips the at least one circuit breaker.

4. The electrical enclosure of claim 1, where the lockout switch arm is configured to be compressed by the dead front.

5. A system, comprising:
   a lockout switch configured to detect a position of a dead front affixed to an electrical enclosure and to automatically generate an actuation signal when the dead front is removed from the electrical enclosure;
   a power disconnection mechanism configured to receive the actuation signal from the lockout switch in response to movement of the dead front and to automatically disconnect power to the electrical enclosure in response to the actuation signal; and
   a lockout switch arm mechanically connected to the lockout switch,
   wherein the lockout switch arm is in a compressed position biasing the dead front when the dead front is attached to the electrical enclosure,
   wherein the lockout switch arm is in a decompressed position when the dead front is removed, and
   wherein the lockout switch arm moves from the compressed position to the decompressed position in response to removal of the dead front.

6. The system of claim 5, where the power disconnection mechanism is a shunt trip breaker configured to trip at least one circuit breaker when actuated by the lockout switch.

7. The system of claim 6, where the shunt trip breaker comprises a permanent magnet and an electromagnet, where the permanent magnet has a first magnetic field, where, when current does not flow through the electromagnet, the electromagnet does not generate a magnetic field, and where, responsive to receiving a control signal, current flows through the electromagnet to generate a second magnetic field opposite the first magnetic field in order that the shunt trip breaker trips the at least one circuit breaker.

8. The system of claim 5, where the lockout switch arm is configured to be compressed by the dead front.

9. The electrical enclosure of claim 1, wherein, responsive to the lockout switch arm moving from the compressed position to the decompressed position, the lockout switch arm automatically activates the lockout switch.

10. The electrical enclosure of claim 1, wherein the lockout switch arm includes a roller structured to engage the dead front when the lockout switch arm is in the compressed position and be disengaged with the dead front when the lockout switch arm is in the decompressed position.

11. The electrical enclosure of claim 2, wherein the shunt trip breaker is different than the at least one circuit breaker.

12. The system of claim 5, wherein, responsive to the lockout switch arm moving from the compressed position to the decompressed position, the lockout switch arm automatically activates the lockout switch.

13. The system of claim 5, wherein the lockout switch arm includes a roller structured to engage the dead front when the lockout switch arm is in the compressed position and be disengaged with the dead front when the lockout switch arm is in the decompressed position.

14. The system of claim 6, wherein the shunt trip breaker is different than the at least one circuit breaker.

* * * * *